United States Patent
Bühler et al.

(10) Patent No.: US 6,192,036 B1
(45) Date of Patent: Feb. 20, 2001

(54) METHOD OF OPERATING A DATA TRANSMISSION SYSTEM

(75) Inventors: Reiner Bühler, Kraichtal; Udo Döbrich, Karlsbad-Spielberg, both of (DE)

(73) Assignee: Siemens AG, Munich (DE)

( * ) Notice: Under 35 U.S.C. 154(b), the term of this patent shall be extended for 0 days.

(21) Appl. No.: 09/011,502

(22) PCT Filed: Jul. 25, 1996

(86) PCT No.: PCT/DE96/01390

§ 371 Date: Jun. 24, 1998

§ 102(e) Date: Jun. 24, 1998

(87) PCT Pub. No.: WO97/05552

PCT Pub. Date: Feb. 13, 1997

(30) Foreign Application Priority Data

Aug. 2, 1995 (DE) .............................. 195 28 437

(51) Int. Cl.[7] .................... H04J 1/16; H04J 3/02
(52) U.S. Cl. ............................ 370/252; 370/462
(58) Field of Search .................... 370/252, 449, 370/443, 432, 458, 461, 462, 447, 442, 437, 438, 241–246, 445, 448, 450, 451, 452, 453–455; 340/825.08, 825.5; 709/223–226

(56) References Cited

U.S. PATENT DOCUMENTS

| | | | |
|---|---|---|---|
| 4,481,572 | 11/1984 | Ochsner | 364/200 |
| 4,595,921 | * 6/1986 | Wang et al. | 340/825.08 |
| 4,779,092 | * 10/1988 | Takao | 340/825.52 |
| 5,132,680 | * 7/1992 | Tezuka et al. | 340/825.08 |
| 5,150,114 | * 9/1992 | Johansson | 340/825.54 |
| 5,283,902 | 2/1994 | Dorn | 395/725 |

FOREIGN PATENT DOCUMENTS

| | | |
|---|---|---|
| 31 28 706 | 6/1983 | (DE) . |
| 40 09 685 | 10/1991 | (DE) . |
| 42 13 792 | 10/1993 | (DE) . |
| 0 133 567 | 2/1985 | (EP) . |
| 0 575 053 | 12/1993 | (EP) . |
| 0 581 063 | 2/1994 | (EP) . |

OTHER PUBLICATIONS

"Field Bus Technology Today and Tomorrow", Georg Färber, Automatisierungstechnische Praxis [Automation Technology Practice], Münich, No. 36, Nov. 1994, pp. 16–36.
"Time Clustered Access for Maximizing Bandwidth Utilization via Widows of Asynchronous Arrival", IBM Technical Disclosure Bulletin, New York, USA, vol. 37, No. 08, Aug. 1994, pp. 207–213.
"The Timed–Token Protocol for Real–Time Communications", N. Malcolm et al., IEEE Computer, Jan. 1994, pp. 35–41.

* cited by examiner

*Primary Examiner*—David R. Vincent
(74) *Attorney, Agent, or Firm*—Kenyon & Kenyon

(57) ABSTRACT

A method for operating a data transmission system with a plurality of stations connected over a common bus, only one of which has access rights to the bus at a given time and controls the data transmission over the bus with call messages addressed to several stations simultaneously. The response times of the called stations are determined. The called stations are parameterized so that they acknowledge and respond to the call message with response messages in the order of their response times. The method is used in field buses in automation technology.

8 Claims, 1 Drawing Sheet

METHOD OF OPERATING A DATA TRANSMISSION SYSTEM

FIELD OF THE INVENTION

The present invention relates to a method of operating a data transmission system.

BACKGROUND INFORMATION

German Patent Application No. 42 13 792 describes a method for operating a data transmission system where data is transmitted to several other stations using a call message, referred to as Call Offering Procedure (COP), sent by a station having the bus access right. The other stations, which have been requested by the COP to transmit a response message, send their response messages in a predefined sequence in time slots of fixed length over the bus line. The options for defining this sequence include hardware coding by the user at startup, parameterization in the initializing phase, or a definition as a function of the station addresses. Direct mapping of station addresses to time slot numbers should be mentioned as a variant that can be implemented inexpensively, where the time slot starting with time t1 is assigned to the station having address 1, time slot at t2 to address 2, etc. The known method improves the transmission rate, but does not represent an optimum solution.

SUMMARY OF THE INVENTION

An object of the present invention is to provide a method for operating a data transmission system where the transmission rate is further increased.

An advantage of the present invention is that the sequence of the stations that are to respond is time optimized. For example, it cannot occur that a station with a very short response time has to wait for the transmission of its data, due to its high station address, until slow stations have responded and transmitted their data. Since the actual transmission times are often short compared to the internal processing time of a polling message by the polled station, the time required for processing a polling message to a plurality of other stations is determined according to the present invention by the response time of the slowest station. The occurrence of no response message, one response message or several response messages received consecutively or in overlapping time periods can be handled by the calling station. A method is provided with which a station in a bus system can collect data simultaneously from one or more stations, can distribute data simultaneously to one or more stations, a station can distribute data to one or more stations and collect data from these stations simultaneously, a station can determine the presence of other stations, and a station can poll other stations for certain features. In addition, other applications of the method are conceivable and possible. The expression "more stations" refers to a group of at least two and a maximum of all the stations connected.

DETAILED DESCRIPTION OF THE INVENTION

In both figures the positions of stations 1–4 are shown by vertical lines and the directions of transmission and points in time of the messages are shown by arrows next to a vertical time axis t.

Figure 1:
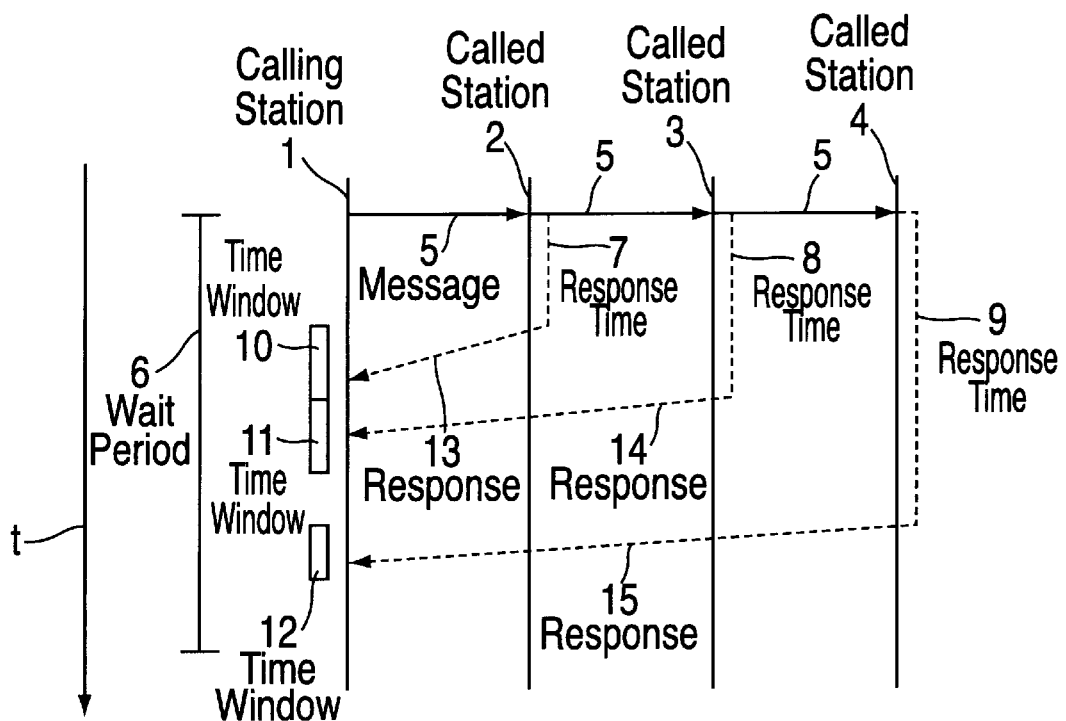
FIG. 1 shows a time sequence of a transmission with response messages received consecutively.

In FIG. 1, a calling station 1 addresses a message 5 to a plurality of other stations 2, 3, and 4, which is received by these stations at approximately the same time. Only those stations meeting certain selection criteria to be explained later consider themselves addressed. The following responses to message 5, to be differentiated by calling station 1, are possible in principle:

no response message from a station within the predefined wait period 6, response message from one station within the predefined wait period 6, and response messages from several, possibly all, called stations 2, 3, or 4 within the predefined wait period 6.

Which of these cases represent OK or non-OK events and how any responses received are to be interpreted and analyzed depends on the application which is being utilized. If there is the possibility of at least one response, wait period 6 starts to elapse at calling station 1; this time is such that called stations 2–4 can respond within this wait period 6 if the system operates properly. If one or more responses are not received within this wait period 6, this is interpreted as defective behavior of the respective stations 2, 3, or 4.

The method according to the present invention may be applied in the data access protocol (layer 2 of the 7-layer model) of the individual stations or in the application (in layers 3–7). The response to the receipt of calling or response messages should be determined by the specific requirements in each particular case. The calling stations give no response prior to the elapse of the above-mentioned wait period 6 even if there is prior reason for doing so. For example, if the method is applied entirely in the data access protocol, a request by the user may interfere with the process, and a response to the user may follow after the wait period 6 as an acknowledgment. The interference may not necessarily come from the user.

Call message 5 contains at least the following parts:

source address (bus address of the calling station, and target address (e.g., global address for addressing all connected stations).

Optionally the following additional components may be present:

selection criteria, execution instructions, and data.

The selection criteria are used for selecting the addressed station. They determine whether an individual station, a group of stations, or all stations are addressed, and, as the case may be, which stations constitute a group. One selection criterion may be, for example, an ID for a specific access channel in the station, similar to an LSAP (Link Service Access Point) of PROFIBUS, which is used there for multicast messages. In that case, all stations in which the requested function is activated in this access channel are addressed. The selection criteria are optional in call message 5. If they are not attached to the message, they must be known to stations 2, 3, and 4 by some other method, e.g., by implicit definition.

The execution instruction is used to communicate the expected response to the called station. Examples for execution instructions include:

collect data from several stations, transmit data to several other stations, collect and transmit data from and to several stations, prepare station mapping, test.

This listing may be supplemented by additional execution instructions. The above-mentioned instructions can also be combined.

The execution instruction does not need to be sent with call message 5. It may also be known to called stations 2, 3, and 4 in some other manner, e.g., by implicit limitation to a single specific instruction or when the instruction depends on the selection criteria or on the status of the station.

The transmitted data can be pure user data or it may contain components that contribute to the performance of the method described. It is optional; for example, no data is transmitted in the call message with the first execution instruction.

The method is performed by the "immediate response" principle, i.e., no other traffic takes place over the bus between call message and response messages or the elapse of wait period 6. Thus, the required wait period 6 can be calculated if the response times of the called stations 2, 3, and 4, as well as the transmission times of the response messages are known. Message transmissions can be repeated, e.g., due to transmission errors.

The response times of the called stations 2, 3, and 4 are indicated with vertical dotted lines 7, 8, and 9, respectively, in FIG. 1. The responses of the different called stations appear consecutively on the bus. This is achieved by providing a time window 10, 11, 12 for each station 2, 3, 4, respectively, in which it is expected to respond. There may be gaps between time windows 10, 11, 12, but they should not overlap. Each called station 2, 3, 4 must know its own time window 10, 11, 12, but it need not know the time windows of the other called stations. None of the called stations may respond outside its respective window. Calling station 1 does not need to know the individual time windows 10, 11, 12, but it should know the wait period 6 for responses 13, 14, 15, which should be long enough to allow all called stations to respond within that period. A list can also be kept in calling station 1, containing called stations 2, 3, 4, for example, to check if all the called stations have responded.

Time windows 10, 11, 12 must be configured and adjusted to one another for each application taking response times 7, 8, 9, and response message transmission times 13, 14, 15 into consideration. In general, they must be selected so that the response messages cannot overlap. The sequence of time windows 10, 11, 12 is determined by response times 7, 8, 9, of called stations 2, 3, 4, respectively. The station with the shortest response time, here station 2, is assigned the first time window, here window 10. There are several options for determining the individual response times. For example, response times can be permanently stored in each station 1–4 and read during the initialization phase by the calling station 1 or a configurator. Furthermore, the response time of each individual station can be determined by sending them call messages. With this information and the bus transmission time, the position of the respective time window can be easily determined and transmitted to called stations 2, 3, 4.

If only data is to be distributed to several stations with a call message, the respective data is contained in call message 5, whose receipt is acknowledged by response messages 13, 14, 15, which contain no data, of calling stations 2, 3, 4.

To collect data, calling station 1 sends a request to the other stations 2, 3, 4 to return data, and receives the desired data in response messages 13, 14, 15. The response messages must be received sequentially in the respective time windows 10, 11, 12 so that they do not interfere with one another. Sequential polling of the individual stations is not required. One call message 1 is sufficient to poll several stations.

If data is to be both distributed and gathered by calling station 1, both call message 5 and response messages 13, 14, 15 contain the respective data.

To test specific station characteristics or features, station 1 transmits a search call message 16 to all other stations 2, 3, 4, which contains the definition of the desired station characteristic as data. Thus the stations can be checked for features such as bus addresses, serial numbers, the presence of a specific function, and manufacturer. All stations having this feature respond to search call message 16. The responses may be received consecutively or overlapping, depending on the type of search call. If the calling station 1 wishes to know whether any station or stations have a certain characteristic, e.g., to check for duplicate bus addresses, the responses may be overlapping. This is illustrated in FIG. 2 for response messages 17 and 18 with an overlapping area 19.

If the calling station 1 wishes to know, for example, how many stations with a certain characteristic are connected to the bus, for example to check for a certain manufacturer, the called stations 2, 3, 4 must transmit their response messages 13, 14, 15 in time windows 10, 11, 12, respectively, according to FIG. 1, so that the number of responses can be determined unambiguously.

FIG. 1 shows that, in order to map the currently connected stations, calling station 1 transmits a call message 5 to all the other stations to determine their presence or operability. All present and operational stations, in this case stations 2, 3, 4, respond with an acknowledgment as a response message 13, 14, 15 to confirm this. The acknowledgments must be received consecutively, so that they do not interfere with one another and the calling station 1 can distinguish between the individual response messages 13, 14, 15. Time windows 10, 11, 12 are therefore used. Since in the method according to the present invention no individual calls to the individual stations are required for mapping the stations, the entire station mapping is prepared virtually at the same time. The station mapping is consistent because the response messages are received within a very short period of time, and the status of the stations is unlikely to change during this time, e.g., due to the failure of a station or to new stations being connected.

Figure 2:
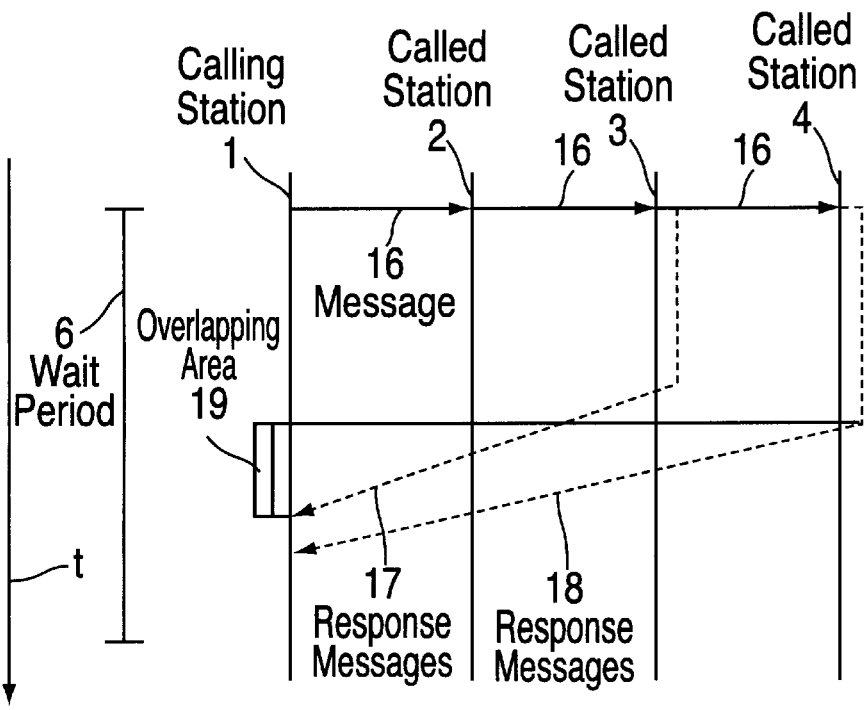
FIG. 2 shows a sequence with overlapping response messages.

In the example of FIG. 2, it is to be checked whether several stations have the bus address. Call message 16 contains this bus address as a feature in the data field. Both stations 3 and 4 have the address and therefore respond to the search call. No other station responds. Here, overlapping is allowed, since we only wish to know whether more than one station responds. If overlapping is allowed, a uniqueness criterion must be present, which is attached to the response messages and ensures that the response messages of different called stations differ from one another. Therefore it must have the characteristic that it is different for all stations involved. Examples of such uniqueness criteria may include:

a serial number,
a unique ID of the called stations in the system,
a specific user-defined criterion,
a quasi-unique random number within a large range, generated in the station.

Combinations of the above examples are also possible. Thus, even when two or more messages fully overlap, there is at least one bit in the information received by calling station 1 that can be recognized in the case of overlapping as a bus failure or a non-identifiable message, for example.

What is claimed is:

1. A method for operating a data transmission system including a plurality of stations interconnected using a common bus, wherein only one station of the plurality of stations has an access right to the bus at a predetermined time and controls a data transmission over the bus using a call message, the call message being addressed to at least two of the plurality of stations, the method comprising the steps of:

determining a response time of each of the at least two of the plurality of stations; and configuring each of the at least two of the plurality of stations to perform in a consecutive order one of i) acknowledge to the call message and ii) respond to the call message, the consecutive order corresponding to the response time of each of the at least two of the plurality of stations, wherein a first station of the at least two of the plurality of stations accesses the bus first, the first station having a shortest response time, and a second station of the at least two of the plurality of stations accesses the bus last, the second station having a longest response time.

2. The method according to claim 1, wherein the method is for a stored-program control.

3. The method according to claim 1, the method further comprising the step of:

in an initialization phase, determining the response time of each of the at least two of the plurality of stations by calling each of the at least two of the plurality of stations individually with the call message.

4. The method according to claim 1, the method further comprising the step of:

assigning a respective time window to each of the at least two of the plurality of stations, each respective time window defining a respective time period during which a corresponding one of the at least two of the plurality of stations can access the bus following an end of the call message.

5. The method according to claim 4, the method further comprising the steps of:

after a last one of the respective time windows is closed, verifying whether all of the at least two of the plurality of stations have one of acknowledged and responded to the call message; and if at least one of the at least two of the plurality of stations has not one of acknowledged and responded to the call message, initiating an error handling routine.

6. The method according to claim 1, the method further comprising the steps of:

transmitting a search message by a first one of the plurality of stations to other ones of plurality of stations, the search message including date identifying a preselected feature; and for each respective station of the other ones of the plurality of stations, responding to the search message if the respective station includes the preselected feature.

7. The method according to claim 6, wherein the preselected feature is one of a bus address, a serial number, a presence of a predetermined function, and a manufacturer identification.

8. The method according to claim 1, the method further comprising the steps of:

transmitting the call message by one of the plurality of station for mapping the plurality of stations; and for each of at least one of the plurality of stations, indicating presence and operability by acknowledging the call message.

\* \* \* \* \*